Patented Mar. 14, 1944

2,344,469

UNITED STATES PATENT OFFICE 2,344,469

ALKYLATION PROCESS

Sumner H. McAllister, Lafayette, and William E. Ross, Berkeley, Calif., assignors to Shell Development Company, San Francisco, Calif., a corporation of Delaware No Drawing. Application November 28, 1940, Serial No. 367,567

12 Claims. (Cl. 260—683.4)

This invention relates to the alkylation of organic compounds by reaction with suitable alkylating agents in the presence of inorganic acids of sulfur capable of catalyzing such alkylations. It is more particularly directed to the improvement of alkylation processes in which sulfuric, chlorosulfonic, fluorsulfonic, and like acids are used as catalysts.

Inorganic sulfur acid alkylation catalysts, particularly concentrated sulfuric acid, are known to be especially advantageous agents for promoting the alkylation of aromatic and analogous heterocyclic compounds, saturated aliphatic compounds having a tertiary carbon atom and the like by reaction with alkyl esters, particularly alkyl halides and sulfates, or olefines or analogous alkylating agents. While such alkylations are indeed essentially catalytic reactions nevertheless the sulfuric acid catalysts have been found in practice to lose their effectiveness in promoting alkylation after relatively short periods of use. Acid which has thus lost its catalytic activity can be regenerated but the treatment required is complicated and involves material loss of acid making regenerated acid quite costly. Consequently acid regeneration is to be avoided as much as possible.

It is one of the objects of the present invention to reduce the expense of regenerating spent alkylation acid catalysts by extending the time during which sulfur acid alkylation catalysts may be used without loss of effectiveness, i. e., increasing the time between regenerations of the acid. Another object is to increase the yield of high quality alkylation products obtainable with a given quantity of catalyst acid. Still another object is to provide a quick and inexpensive test for determining the suitability of a given starting material for use in an alkylation process. Further objects and advantages of the invention will be apparent from the following description.

The cause of loss of effectiveness of alkylation catalysts such as sulfuric acid is not fully known and probably varies with the nature of the reactants used and the conditions of alkylation employed. It is well established, however, that during use sulfuric acid and like alkylation catalyst acids gradually decrease in concentration and that, particularly after a certain point, which varies depending upon the particular alkylation involved, such decrease in acid concentration is associated with a marked increase in the proportion of undesirable by products which finally become so great in amount that the acid must be discarded and replaced by fresh catalyst if economical yields are to be maintained. Whatever the explanation of these phenomena, it has been found that the effective life of the catalyst can be greatly increased by treating the feed stock with a suitable hydrocarbon insoluble organic acid such as formic acid.

For the purpose of making the invention more clear, it will be described in particular relation to its application to the alkylation of hydrocarbons with olefines such as are obtained by cracking or dehydrogenation of petroleum products using concentrated sulfuric acid as the catalyst. This application of the invention is emphasized because of its importance in the manufacture of aviation gasoline, but is not intended to be limitive since similar advantages and improvements may be obtained in other alkylation reactions carried out with sulfuric acid or halo sulfonic acids or mixtures thereof. In fact, the high cost, short life and difficulty of regenerating halo-sulfonic acid alklation catalysts such as chlor- and fluorsulfonic acids, makes the present process of even greater relative value where alkylation with such catalysts is used.

When olefinic alkylation feed stocks are shaken with concentrated formic acid, preferably 85 to 100% formic acid, colors ranging from pink to a deep greenish-black develop in the acid phase. Heat may also be liberated. The intensity of the coloration of the acid is in about the same order as the sulfuric acid consumption obtained when the respective feeds are used for alkylation. This provides a simple method for determining the suitability of a given starting material for use as feed in a sulfuric acid alkylation process. The test is valuable whether or not treatment of the feed stock with formic acid prior to alkylation in the presence of an inorganic sulfur acid alkylation acid in accordance with the invention is used.

It is evident that the formic acid reacts with or dissolves some constituent or constituents of those alkylation feed stocks which give short catalyst life when used in alkylation with inorganic sulfur acid alkylation catalysts. The feed stocks in use for alkylation are known to frequently contain mercaptans, disulfides, dienes, thiophenes and oxygen compounds among other constituents. Treatment with hydrocarbon insoluble organic acids in accordance with the invention materially reduces the sulfur content of such mixtures and also appears to polymerize the dienes and other gum-forming constituents. The advantageous results of the treatment may be due at least in part to changes of this nature.

But whatever the nature of the changes brought about in the feed stocks by the formic acid, it has been established that the treatment is capable of materially increasing the life of sulfuric acid used as catalyst for alkylation with such feeds as shown by the following typical examples.

Example I

A cracked gasoline of 70° C. and point was treated with 90% formic acid in a stirred mixer maintained at 50° C. The treatment was carried out continuously using an initial mixer charge of acid and cracked gasoline in equal volumes and feeding in gasoline and withdrawing emulsified mixture to a decanter from which the separated formic acid phase was returned to the mixer. The average time of contact of acid and hydrocarbon was about 18–20 minutes at the start and about 25 minutes at the end when the ratio of acid to gasoline was about 0.6/1. Comparative analyses of the starting material and the steam-distilled treated gasoline showed that the treatment caused a decrease in the total sulfur from 0.034% to 0.012% with a reduction in bromine number from 131 to 128, probably due to polymerization of dienes.

Alkylation of isobutane with the treated gasoline was carried out using 0.7 volume of 98% sulfuric acid per volume of hydrocarbon at 10° C. and a mol ratio of isobutane to olefines of 10 to 1. The feed rate was 3.9 to 4.3 volumes per hour per volume of reactor space corresponding to an average contact time of about 10 minutes.

The life of the sulfuric acid catalyst was 11.2 volumes of alkylate per volume of acid used compared with 8.9 volumes for the untreated feed. A yield of 130 weight per cent based on the gasoline used was obtained and the product contained about 83% of hydrocarbons boiling between 23° C. and 150° C., and having a bromine number of 0.6 and an octane number of 82.5 which was increased to 94.5 by addition of 1 c.c. of tetraethyl lead per gallon.

Example II

The same cracked gasoline as used in Example I was treated in the same way with 90% formic acid at 70° C. Subsequent alkylation of isobutane using a feed containing 75% by weight of isobutane, 7.2% normal butane and 17.8% of treated gasoline gave under the same reaction conditions an acid life of 12.5 volumes of alkylate per volume of sulfuric acid. The product in this case contained about 85.5% of hydrocarbons boiling in the aviation gasoline range.

Example III

A predominantly pentane-amylene fraction (63° C. end point) of cracked hydrocarbons was successively treated for 30 minute periods with one-fifth its volume of 90% formic acid in a pressure vessel equipped with a stirrer and maintained at 70° C. After each treatment the separated hydrocarbon phase was tested with fresh formic acid to see if color development had been sufficiently reduced. This was attained after the fifth treatment. The treated gasoline was then washed first for 30 minutes with an equal volume of water, then with the same quantity of 5% sodium hydroxide solution and finally with water again. After drying the treated hydrocarbon was distilled to its original end point.

Another part of the same fraction was similarly caustic-washed, water washed, dried and redistilled to prepare feed for a comparative run.

In each case isobutane was alkylated with the predominantly amylene - containing fraction under the following conditions:

Catalyst _____ 100% H₂SO₄
Volume ratio H₂SO₄ to hydrocarbon_____ 1/1
Contact time _____minutes__ 10
Temperature _____°C__ 10
Composition of hydrocarbon feed:
  Isobutane_____percent by weight__ 73.5
  N-butane _____do____ 8.5
  Propane _____do____ 2.5
  Olefine fraction_____do____ 15.5
Mol ratio isobutane to olefines_____ 10/1

Under these conditions the following results were obtained:

| Feed | Caustic and water washed and redistilled only | Formic acid treated, caustic and water washed and redistilled |
|---|---|---|
| Acid life (vols. of alkylate per vol. of acid before acid concentration decreased to 85%) | 7 | 10 |
| Per cent aviation fraction (1℃-150° C.) in the product | 88.3 | 91.1 |
| Octane number of 15-150° C. fraction | 86 | 86 |

Other highly ionized organic acids which are sufficiently insoluble in the material being treated may be used in place of the formic acid employed in the foregoing examples. Thus, for example, dicarboxylic acids such as oxalic and malonic acids and halogenated acids as mono- and polychloracetic acids, and particularly hydroxy carboxylic acids such as hydroxyacetic, lactic, tartaric and like acids may be advantageously used. Acetic acid and the like are less advantageous because of their greater solubility in hydrocarbons. It is sometimes preferable to use mixtures of acids and not only mixtures of the foregoing substantially hydrocarbon-insoluble organic acids but also mixtures of one or more such acids with a suitable inorganic acid may be applied. In the latter case it is preferable to employ a relatively weak inorganic acid such, for example, as boric acid. Thus, mixtures of lactic acid and boric acid and of tartaric acid and boric acid have been found to give results similar to those described in the foregoing examples.

The process of the invention is not only applicable to the treatment of olefinic starting materials for the alkylation reaction but also may advantageously be applied to the isoparaffins or other compounds which are to be alkylated. In some cases the compound to be alkylated and the alkylating agent may be treated together with formic acid but usually the two reactants require different degrees of treatment and may be more efficiently treated separately with the same or different hydrocarbon-insoluble strong organic acids.

Any suitable method of contacting the material to be treated and the formic or like acid may be employed. The treatment may be carried out batch-wise, intermittently or continuously. The material being treated may be in either the liquid or the vapor phase. Thus, for example, hydrocarbon vapors may be bubbled through a pool of formic acid or may be passed up through a suitably packed tower down which the acid is allowed to trickle, or liquid phase methods of contacting, either concurrent or countercurrent, may be used.

The amount of formic or similar acid which it is desirable to employ and the temperature at which the treatment is most advantageously carried out will depend upon the particular stock being treated. In most cases the higher the temperature used, the shorter time of contact required. For high temperature treatments operation under superatmospheric pressure is usually most suitable, but it is, of course, inadvisable to use temperatures which lead to decomposition or other undesirable changes in the materials required for the alkylation reaction. Temperatures of the order of about 50° to about 150° C. are preferred and as a general rule treatment with at least an equal volume of the chosen organic acid is desirable.

The strong organic acid used for the treatment can be re-employed in the process. Most preferably it is subjected to suitable treatment for the separation of accumulated impurities before it is reused. Such separation may be effected by fractional distillation or by first selectively extracting the formic acid and then distilling the extract. Any small amounts of formic acid which dissolve in the material being treated may likewise be separated and reused in the process.

The process of the invention is of particular advantage in making economically available as alkylating agents the higher olefinic fractions of cracking products which previously have been little used because they required so much more sulfuric acid alkylation catalyst than the lower olefines such as butylenes. It is not only useful when such olefines are employed as alkylating agents directly as described, for example, in copending applications, Serial No. 150,544, filed June 26, 1937, and Serial No. 276,062, filed May 27, 1939, but also is advantageous when such olefines are converted to sulfate esters prior to use in the alkylation operation, for example, by absorbing the olefines in sulfuric acid and feeding the resulting absorption product to the alkylation unit as disclosed and claimed in copending application, Serial No. 305,498, filed November 21, 1939. The expression, "alkylating with an olefine," as used in the accompanying claims, is intended to cover either such direct or indirect methods of operation. The process is applicable where inorganic sulfur acid alkylation catalysts are used in admixture with other alkylation catalysts or other advantageous materials such, for example, as hydrogen chloride and the like as claimed in copending application, Serial No. 321,803, filed March 1, 1940, now U. S. Patent 2,259,723. While the organic acids are preferably used in the liquid state in the treatment step of the invention, they may also be employed at temperatures below their melting points by applying them in the form of solutions in solvents which are incompletely miscible with the hydrocarbon being treated. Thus, for example, aqueous solutions, preferably concentrated, of oxalic or malonic acid may be advantageously used. Alternatively suitable solutions in alcohol, acetone or the like may be employed. It will therefore be apparent that the process is capable of wide variation, not only with respect to the starting materials which may be used but also in regard to the methods employed for its execution, and that the invention is not limited to the details disclosed nor by any theory suggested in explanation of the improved results achieved.

We claim as our invention:

1. In a process for producing a branched chain nonane by reacting isobutane with amylene-containing hydrocarbon in the presence of concentrated sulfuric acid, the method of increasing the effective life of the sulfuric acid which comprises contacting said amylene-containing hydrocarbon with at least an equal volume of formic acid of at least 85% concentration at a temperature between 50° C. and 150° C. and separating the acid from the hydrocarbon prior to contacting the amylene with said sulfuric acid.

2. In a process for producing a branched chain paraffin by reacting isobutane with an olefine-containing fraction of cracked gasoline in the presence of concentrated sulfuric acid, the method of increasing the effective life of the sulfuric acid which comprises contacting said cracked gasoline fraction with formic acid of at least 85% concentration at a temperature between 50° C. and 150° C. and separating the acid from said fraction prior to contacting the fraction with said sulfuric acid.

3. In a process for producing a branched chain paraffin by reacting an isoparaffin with olefine-containing hydrocarbon in the presence of concentrated sulfuric acid, the method of increasing the effective life of the sulfuric acid which comprises contacting said olefine-containing hydrocarbon with formic acid of at least 85% concentration and separating the acid from the hydrocarbon prior to contacting said hydrocarbon with said sulfuric acid.

4. In a process for producing a branched chain paraffin by reacting an isoparaffin with olefine-containing hydrocarbon in the presence of concentrated sulfuric acid, the method of increasing the effective life of the sulfuric acid which comprises contacting said olefine-containing hydrocarbon with tartaric acid at a temperature between 50° C. and 150° C. and separating the acid from the hydrocarbon prior to contacting said hydrocarbon with said sulfuric acid.

5. In a process for producing a branched chain paraffin by reacting an isoparaffin with an olefine in the presence of an inorganic sulfur acid alkylation catalyst, the method of increasing the effective life of said catalyst which comprises contacting at least one of said reactants with a hydrocarbon-insoluble strong hydroxy carboxylic acid and separating said acid from the reactant prior to contacting said reactant with said catalyst.

6. In a process for producing a branched chain paraffin by reacting an isoparaffin with an olefine in the presence of an inorganic sulfur acid alkylation catalyst, the method of increasing the effective life of said catalyst which comprises contacting at least one of said reactants with a hydrocarbon-insoluble strong polycarboxylic acid and separating the acid from the reactant prior to contacting said reactant with said catalyst.

7. In a process for producing a branched chain paraffin by reacting an isoparaffin with an olefine in the presence of an inorganic sulfur acid alkylation catalyst, the method of increasing the effective life of said catalyst which comprises contacting at least one of said reactants with a hydrocarbon-insoluble strong carboxylic acid and separating the acid from the reactant prior to contacting said reactant with said catalyst.

8. In a process for producing an alkylation product by reacting an aromatic hydrocarbon with an olefine in the presence of an inorganic sulfur acid alkylation catalyst, the method of increasing the effective life of the said catalyst which comprises contacting said olefine with a hydrocarbon-insoluble strong -carboxylic acid and separating the acid from the olefine prior to contacting said olefine with said catalyst.

9. In a process for producing an alkylation product by reacting an alkylatable hydrocarbon with an olefine in the presence of an inorganic sulfur acid alkylation catalyst, the method of increasing the effective life of the said catalyst which comprises contacting said olefine with a hydrocarbon-insoluble strong carboxylic acid and separating the acid from the olefine prior to contacting said olefine with said catalyst.

10. In a process for producing an alkylation product by reacting an alkylatable hydrocarbon with an alkylating agent in the presence of an inorganic sulfur acid alkylation catalyst, the method of increasing the effective life of said catalyst which comprises contacting said hydrocarbon with a hydrocarbon-insoluble strong carboxylic acid and separating the acid from the hydrocarbon prior to contacting said hydrocarbon with said catalyst.

11. In a process for producing an alkylation product by reacting an alkylatable hydrocarbon with an alkylating agent in the presence of an inorganic sulfur acid alkylation catalyst, the method of increasing the effective life of said catalyst which comprises contacting at least one of said reactants with a hydrocarbon-insoluble strong carboxylic acid at a temperature between 50° C. and 150° C. and separating the acid from the reactant prior to contacting said reactant with said catalyst.

12. In a process for producing an alkylation product by reacting an alkylatable hydrocarbon with an alkylating agent in the presence of an inorganic sulfur acid alkylation catalyst, the method of increasing the effective life of said catalyst which comprises contacting at least one of said reactants with a hydrocarbon-insoluble strong carboxylic acid and separating the acid from the reactant prior to contacting said reactant with said catalyst.

SUMNER H. McALLISTER.
WILLIAM E. ROSS.